United States Patent Office 3,562,321
Patented Feb. 9, 1971

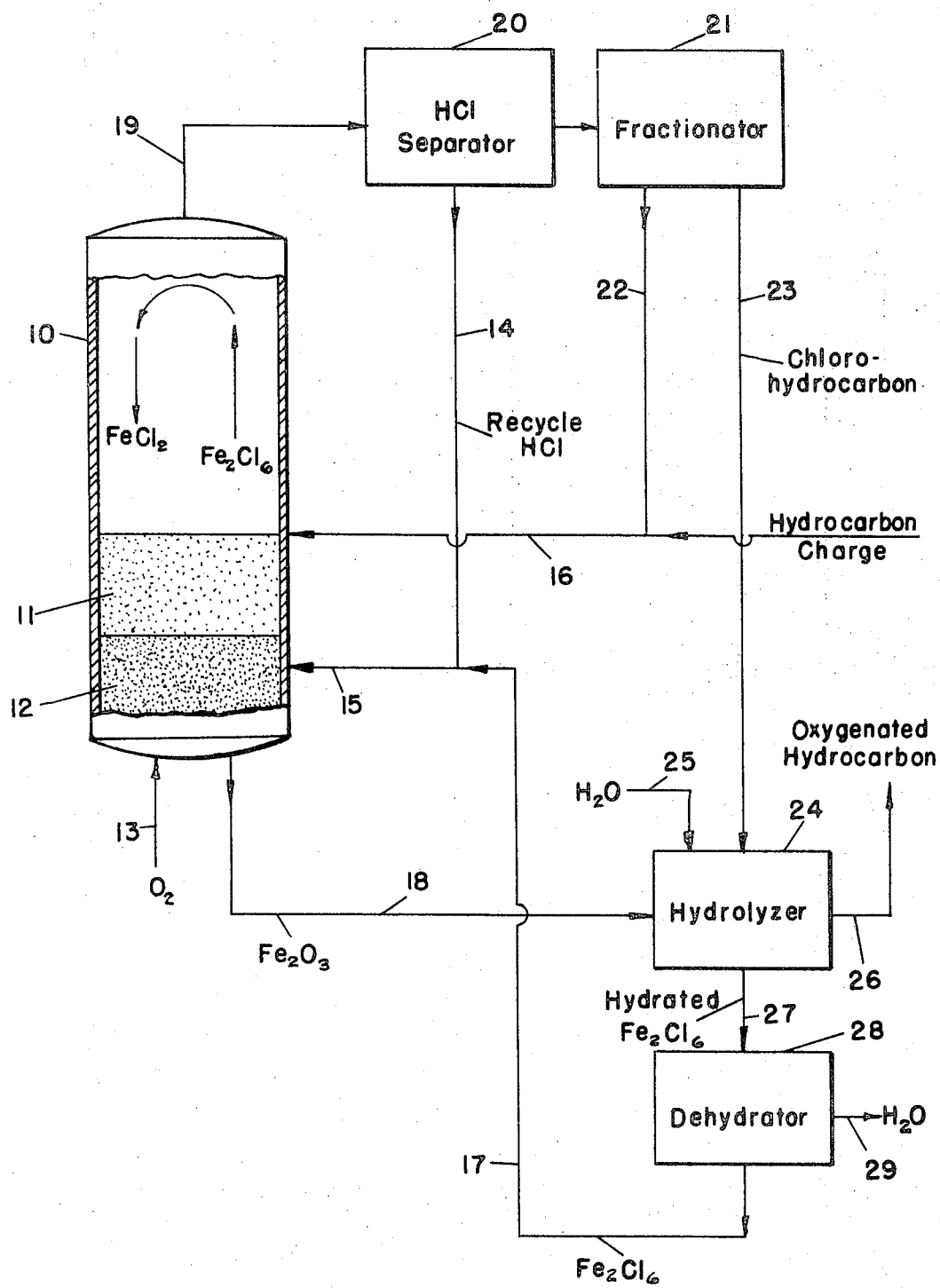

3,562,321
PREPARATION OF OXYGENATED
HYDROCARBONS
Walter L. Borkowski and John J. van Venrooy, both of Media, Pa., assignors to Sun Oil Company, Philadelphia, Pa., a corporation of New Jersey
Filed Oct. 10, 1961, Ser. No. 144,221
Int. Cl. C07c 51/00, 29/00
U.S. Cl. 260—533                                  6 Claims

ABSTRACT OF THE DISCLOSURE

This invention relates to a process for producing oxygenated hydrocarbons such as alcohols, glycols, aldehydes, acids and the like by reaction of hydrocarbons with ferric chloride to form chlorohydrocarbons and hydrolysis of the chlorohydrocarbons.

---

Ferric chloride is capable of reacting with hydrocarbons at temperatures above 220° C. to form chlorohydrocarbons and by-product hydrogen chloride. For example, methane can be reacted with $Fe_2Cl_6$ to form all of its chlorohydrocarbon derivatives, namely, methyl chloride, methylene chloride, chloroform and carbon tetrachloride. Alkanes higher than methane can react to form both saturated and unsaturated chlorohydrocarbons. For example, ethane can be reacted to form practically all of the $C_2$-chlorohydrocarbons such as ethyl chloride, vinyl chloride, dichloroethane, dichloroethylenes, trichloroethane, trichloroethylene, tetrachloroethane, tetrachloroethylene and the like. Aromatic hydrocarbons such as benzene, toluene, xylenes, naphthalene, alkyl naphthalenes and the like also will react with ferric chloride to yield chloroaryl derivatives.

In the reaction of ferric chloride with hydrocarbons (herein referred to as "ferrichlorination"), the iron salt is reduced to the ferrous state. For a commercial operation it is essential to provide means for converting the salt back to ferric chloride for re-use. It is also important to recover the by-product hydrogen chloride from the chlorination product and utilize it in the conversion of the reduced iron salt to the higher valence state.

In the process of the present invention, the ferrichlorination reaction zone is operated in a manner such that the ferrous chloride formed by reaction of ferric chloride with the hydrocarbon charge is converted in part back to ferric chloride and in part to ferric oxide by reaction with the by-product hydrogen chloride obtained and with oxygen. The ferric oxide is then transferred to a hydrolysis zone and used to promote hydrolysis of the chlorohydrocarbon produced in the ferrichlorination reaction to produce oxygenated products. In the hydrolysis step the ferric oxide is converted to hydrated ferric chloride which is then dehydrated and recycled to the ferrichlorinator. There is essentially no net loss of chlorine from the system.

According to the invention a ferrichlorination reaction zone maintained at a temperature in the range of 315–500° C., more preferably 350–425° C., and containing a moving bed of iron compounds is utilized. The bed varies in composition from ferrous chloride at the top to ferric oxide at the bottom. Vaporized hydrocarbon heated to the desired reaction temperature is fed into the ferrichlorinator above the bed. By-product HCl recovered from the reaction product is fed into the bed at an intermediate level and ferric chloride in vapor form is introduced into the reaction zone at any desired level between the ferric oxide portion of the bed and the lower part of the vapor space above the bed. A stream of oxygen, which advantageously can be air, is fed into the bottom of the reactor. The reactions which continuously occur in the ferrichlorinator can be depicted as follows, assuming that methane is being reacted to produce methyl chloride:

(1)
$$CH_4 + Fe_2Cl_6 \rightarrow CH_3Cl + HCl + 2FeCl_2$$

(2)
$$FeCl_2 + HCl + \tfrac{1}{4} O_2 \rightarrow \tfrac{1}{2} Fe_2Cl_6 + \tfrac{1}{2} H_2O$$

(3)
$$FeCl_2 + \tfrac{1}{4} O_2 \rightarrow \tfrac{1}{6} Fe_2O_3 + \tfrac{1}{3} Fe_2Cl_6$$

From equation (2) it can be seen that one-half of the ferrous chloride formed reacts with oxygen and the by-product HCl which is returned to the reactor, thus being converted back to the higher valence state. As shown by Equation 3 the other half of the ferrous chloride is converted in part to ferric chloride and in part to ferric oxide. The ferric chloride produced in each of these reactions immediately becomes a vapor and continuously flows upwardly to the vapor space above the bed where it reacts with the hydrocarbon charge.

The ferric oxide produced according to Equation 3 is transferred to another zone and used to promote the hydrolysis of the chlorohydrocarbon formed in the ferrichlorinator. For example, for the hydrolysis of methyl chloride to methanol, the following reaction occurs in the hydrolyzer:

(4)
$$CH_3Cl + \tfrac{1}{2} H_2O + \tfrac{1}{6} Fe_2O_3 \rightarrow CH_3OH + \tfrac{1}{6} Fe_2Cl_6$$

The ferric oxide, being a uniform fine powder, is especially effective for promoting this hydrolysis reaction. The resulting ferric chloride is in a hydrated form and can be dehydrated in a further step and then recycled to the ferrichlorinator.

The particular oxygenated products obtained from the hydrolysis step will depend upon what the chlorohydrocarbon products are that are produced in the ferrichlorination step. As indicated by Equation 4 supra, methanol can be produced from methyl chloride. This reaction is favored at temperatures in the range of 100–135° C. On the other hand, dimethyl ether can also be produced by hydrolyzing methyl chloride and this reaction is favored at temperatures above 140° C. Examples of other chlorohydrocarbons and the hydrolysis products obtained therefrom are shown in the following tabulation:

| Chlorohydrocarbon | Hydrolysis product |
|---|---|
| Methylene chloride | Formaldehyde. |
| Chloroform | Formic acid. |
| Ethyl chloride | Ethanol and diethyl ether. |
| Ethylene dichloride | Ethylene glycol. |
| 1,1,2-trichloroethane | Glycolic aldehyde. |
| 1,1,1,2-tetrachloroethane | Glycolic acid. |
| Hexachloroethane | Oxalic acid. |
| Phenyl chloride | Phenol. |
| Benzyl chloride | Phenyl methanol. |

When a plurality of chlorohydrocarbons is obtained from the ferrichlorinator as is usually the case, they can be hydrolyzed together and the several oxygenated products thereafter can be separated from each other by distillation. Alternatively, the chlorohydrocarbons can first be fractionated from each other and then hydrolyzed individually, utilizing an appropriate proportion of the ferric oxide from the ferrichlorinator in each hydrolysis step.

The invention is described more specifically in conjunction with the accompanying drawing which is a schematic illustration of the process.

With reference to the drawing, 10 illustrates the reactor which contains a bed of iron compounds in its lower part. The upper part of the bed comprises ferrous chloride illustrated at 11 while the lower part consists of ferric oxide illustrated at 12. While the bed has been illustrated as comprising two distinct zones of different compositions, there is actually a gradation of composition varying from ferric oxide at the bottom to ferrous chloride at the top. The temperature throughout the reactor is maintained in the range of 315–500° C., more preferably 350–425° C. Higher reaction temperatures in the specified range tend to increase the degree of chlorination effected in the process. Oxygen (air) is introduced into the bottom of the reactor through line 13 and by-product HCl recovered from the reaction product is recycled through lines 14 and 15 into the bed at an intermediate level. Heated hydrocarbon charge is fed into the reactor above the bed via line 16. Recovered ferric chloride is also continuously introduced as a vapor through lines 17 and 15. Reaction of the oxygen and HCl with the $FeCl_2$ causes the formation of additional gaseous $Fe_2Cl_6$. The $Fe_2Cl_6$ passes upwardly into the vapor space above the bed where it reacts with the hydrocarbon and hence is reduced to $FeCl_2$. Fine solid particles of $FeCl_2$ are formed and these fall downwardly to the top of the bed. There is thus a continuous flow of gaseous $Fe_2Cl_6$ upwardly from the bed and a continuous return of solid $FeCl_2$ to it. Ferric oxide is continuously withdrawn from the bottom of the reactor through line 18 at a rate that will maintain the top of the bed at approximately a constant level.

The reaction product flows from the top of reactor 10 through line 19 to a separator 20 for removing the HCl. Any conventional or suitable procedure for separating HCl from hydrocarbons or hydrocarbon derivatives can be used. For example, the procedure described in Chem. and Eng. Progress, December, 1960, pages 67–73 can be employed. This involves contacting the HCl-containing mixture with a 20% aqueous solution of HCl and stripping absorbed HCl from the rich absorption medium. The recovered HCl is recycled as previously specified.

The HCl-free material from separator 20 passes to a fractionator 21 where unreacted hydrocarbon is separated from the chlorohydrocarbon product. Nitrogen can also be separately removed if air has been used as the source of oxygen in the process. The unreacted hydrocarbon is recycled through lines 22 and 16 to the reactor.

The above-described portion of the process is applicable to the ferrichlorination of any hydrocarbon stock which is a vapor at the selected reaction temperature within the range of 315–500° C. and whose chlorination products can be maintained in vapor phase at such temperature level. The hydrocarbon charge can be a paraffin, olefin, naphthene or aromatic hydrocarbon. Preferred charge materials are methane and ethane, which can be converted in the process to valuable oxygenated petrochemicals.

The chlorohydrocarbon product from fractionator 21 is sent through line 23 to hydrolyzer 24. Water enters the hydrolyzer through line 25 and ferric oxide is fed thereto through line 18. The temperature in the hydrolyzer is maintained in the range of 100–200° C. and more preferably 120–160° C. The time allowed for the hydrolysis can vary widely depending upon the temperature used and the particular chlorohydrocarbon being hydrolyzed but typically may be 15–20 hours at 120° C. and 2–3 hours at 150° C. The oxygenated product produced as indicated by line 26 can be separated from the hydrolysis mixture by distillation (not shown) along with water which is in excess of that which combines to form hydrated ferric chloride.

The hydrated ferric chloride, which passes from hydrolyzer 24 through line 27 to a dehydrator 28, is mainly the hexahydrate. Since this material has a melting point of 37°C., it can readily be handled as a liquid and can be pumped to the dehydrator. Drying can be effected by heating to drive off the water as indicated by line 29 but this procedure is not preferred since ferric chloride tends to hydrolyze to form basic salts at the elevated temperatures required to remove the water. The preferred procedure comprises passing dry HCl in contact with the hydrated ferric chloride in amount sufficient to remove all of the water. The temperature for such operation should be above 66° C., since this is the transition temperature at which the anhydrous form of ferric chloride is the stable form; and a considerably higher temperature can be used, for example, up to 250° C. Such drying by means of HCl can be done conveniently in a countercurrent spray type drier. The use of HCl as the drying agent has the additional advantage that any FeOCl and $Fe_2O_3$ that may be present in the mixture are converted to ferric chloride. The dried $Fe_2Cl_6$ is recycled through lines 17 and 15 to the ferrichlorinator 10, being preferably introduced thereto as a vapor at the desired ferrichlorination temperature. The wet HCl from the drying operation can be fractionally distilled to recover dry HCl for re-use.

In the copending application of Borkowski et al., Ser. No. 102,743, filed Apr. 13, 1961, a process is described wherein methane is chlorinated by means of ferric chloride in one zone and the resulting ferrous chloride is then transported to entirely separate zones wherein it is converted partly back to ferric chloride and partly to ferric oxide. The latter is then used in a hydrolysis step to convert the methyl chloride produced in the first reaction into methanol and/or dimethyl ether. The mode of operating the present process is distinct from that of the aforesaid application, in that a single reactor is here used to effect chlorination of the hydrocarbon charge, to continuously convert a portion of the resulting ferrous chloride back to the ferric form and to convert the remainder of the ferrous chloride into ferric oxide for use in the hydrolysis step. In the present process there is a continuous evolution of gaseous ferric chloride upwardly from the bed 11 and a continuous settling of solid ferrous chloride back to the top of the bed from the space thereabove.

We claim:
1. Method of preparing oxygenated hydrocarbon which comprises:
 (a) feeding hydrocarbon in vapor phase at an intermediate level into a reactor maintained at a temperature in the range of 315–500° C., said hydrocarbon and its chlorination reaction products being a vapor at the selected reaction temperature and said reactor containing beneath the level of hydrocarbon introduction a bed of iron compounds comprising a ferrous chloride mass in its upper part and a ferric oxide mass in its lower part,
 (b) feeding gaseous ferric chloride into said reactor and reacting it with the hydrocarbon above said bed, whereby chlorination of hydrocarbon occurs with the formation of by-product hydrogen chloride and the ferric chloride is reduced to solid ferrous chloride which falls downwardly to said bed,
 (c) removing a mixture of chlorohydrocarbon and hydrogen chloride from the upper part of said reactor,
 (d) recovering hydrogen chloride from the mixture,
 (e) introducing the hydrogen chloride into the bed at a level near the top of the ferric oxide mass,
 (f) passing oxygen into the ferric oxide mass beneath the level of introduction of the hydrogen chloride,
 (g) flowing said oxygen upwardly through the bed and in contact with the ferrous chloride, whereby the ferrous chloride is continuously converted in part to gaseous ferric chloride and in part to ferric oxide,
 (h) removing ferric oxide from the bottom of said reactor,
 (i) contacting said chlorohydrocarbon with water at a temperature in the range of 100–200° C. and in the presence of the removed ferric oxide, whereby the chlorohydrocarbon is hydrolyzed to oxygenated hydrocarbon and the ferric oxide is converted to hydrated ferric chloride,
 (j) dehydrating the ferric chloride,
 (k) and recycling the dehydrated ferric chloride to said reactor in amount substantially equivalent to the ferric oxide removed therefrom.

2. Method according to claim 1 wherein the first-mentioned temperature is in the range of 350–425° C.

3. Method according to claim 2 wherein the second-mentioned temperature is in the range of 120–160° C.

4. Method according to claim 1 wherein the second-mentioned temperature is in the range of 120–160° C.

5. Method according to claim 1 wherein said hydrocarbon is methane.

6. Method according to claim 1 wherein said hydrocarbon is ethane.

References Cited

UNITED STATES PATENTS

| | | | |
|---|---|---|---|
| 2,399,488 | 4/1946 | Hearne | 260—659 |
| 2,677,598 | 5/1954 | Crummett et al. | 23—87 |
| 2,752,223 | 6/1956 | Reeve | 23—87 |
| 3,172,915 | 3/1965 | Borkowski et al. | |

FOREIGN PATENTS

| | | | |
|---|---|---|---|
| 29,964 | 3/1914 | Great Britain | 260—640 |
| 214,293 | 4/1924 | Great Britain | 260—659 |
| 701,797 | 1/1954 | Great Britain | 23—87 |

OTHER REFERENCES

Finar: Organic Chemistry, vol. 1, p. 106, 1959.

Mellor: Comprehensive Treatise on Inorganic and Theoretical Chemistry, vol. 14 (1935), p. 20.

Reney: Treatise on Inorganic Chemistry, vol. 11 1956.

HOWARD T. MARS, Primary Examiner

U.S. Cl. X.R.

260—602, 604, 614, 618, 629, 636, 640, 659, 664